Dec. 10, 1957 L. G. L. THOMAS ET AL 2,815,683
POWER-OPERATED MECHANISM
Filed Sept. 26, 1956 4 Sheets-Sheet 1

INVENTORS
LOUIS G. L. THOMAS
SAMUEL K. LEHMAN
BY
George F. Des Marais
ATTORNEY

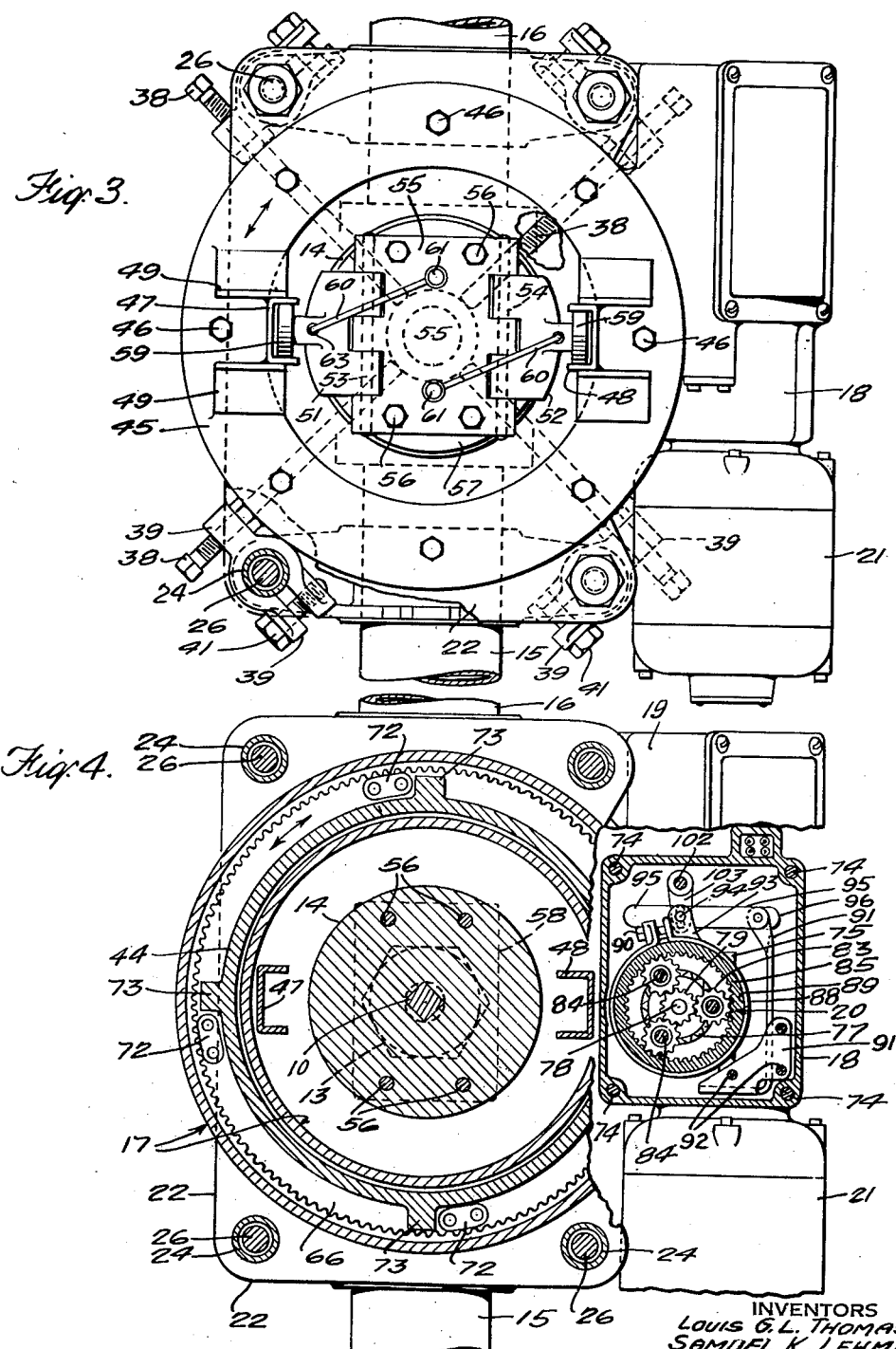

Dec. 10, 1957  L. G. L. THOMAS ET AL  2,815,683
POWER-OPERATED MECHANISM
Filed Sept. 26, 1956  4 Sheets-Sheet 3

INVENTORS
LOUIS G.L. THOMAS
SAMUEL K. LEHMAN
BY
George F. Des Marais
ATTORNEY

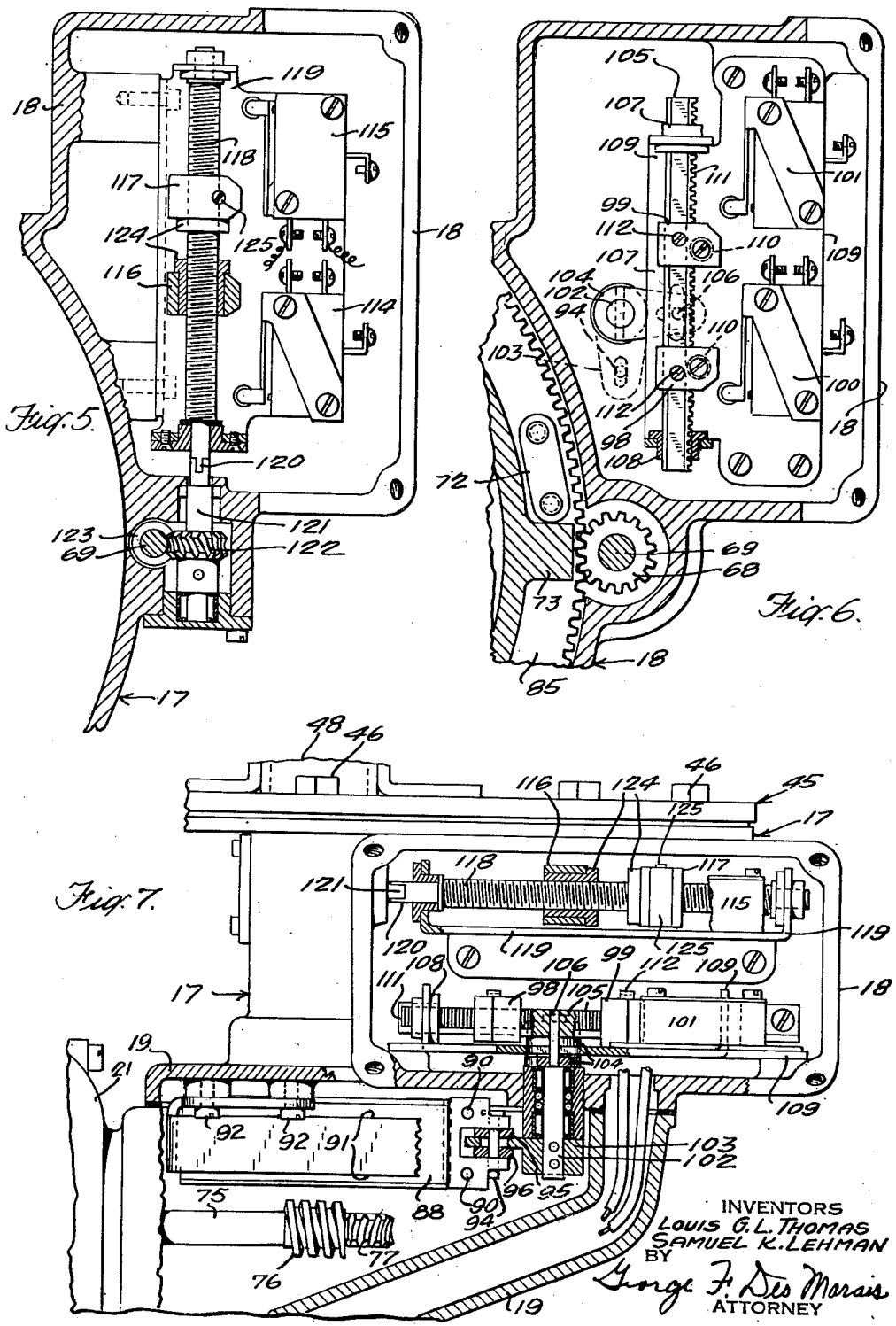

United States Patent Office 2,815,683
Patented Dec. 10, 1957

2,815,683

POWER-OPERATED MECHANISM

Louis G. L. Thomas, Merion Station, Pa., and Samuel K. Lehman, Brooklyn, N. Y., assignors to C. H. Wheeler Manufacturing Company, Philadelphia, Pa., a corporation of Pennsylvania Application September 26, 1956, Serial No. 612,126

8 Claims. (Cl. 74—626)

This invention relates to valve operators or power-operated mechanisms for attachment to a valve to enable operation of the valve by a motor, as well as by hand. The valve operator comprises rotary parts for actuating a handle or handwheel, a reversible motor, speed reduction gearing between said motor and the handwheel actuating parts, all mounted on a base member which is adapted to be supported in fixed relation to a valve body without requiring any change in the valve, or ready accessibility to its original handwheel for manual operation. The base member supports the actuating parts beyond the outer periphery of the handwheel and these parts are so constructed as to enable a driving connection between them and devices which are attached to the handwheel. The actuating parts include guides extending parallel to the axis of the handwheel a distance corresponding to the distance of axial movement of the handwheel between open and closed positions of the valve, whereby as the handwheel is rotated the handwheel is permitted to rise or lower with respect to the valve in accordance with the direction of rotation of the actuating parts. The driving connection to the handwheel is so constructed as to enable ready disassociation from a driving relationship so that the handwheel may be operated manually should manual operation be desired under any circumstances such as failure of power. The valve always remains available for use during the attachment of the power operator and after the operator is mounted in position.

The speed reduction gearing of the present embodiment is characterized by its compactness and its use as part of a valve operator designed to conserve space and to be accommodated for use with small valves. It includes an epicyclic gear train having one member driven from a motor, a second member for driving the handwheel actuating parts, and a third member intermediate the first and second members, the second member carrying planet gears meshing with the first member and with the third member. The third or intermediate member is a ring gear rotatably supported on bearings mounted on the outer periphery of the planet gear-carrying member. By finishing the outer periphery of the ring gear as a brake drum surface, and seizing a brake band around the drum, the torque transmitted through the gearing is measured at the greatest radius available in the gearing.

The torque on the brake band is resiliently balanced by a cantilever spring which flexes in one direction during a closing movement of the valve operator, and in the opposite direction during an opening movement of the valve operator proportionately to the torque transmitted through the gearing. The actuation of switches for discontinuing the operation of the motor to limit the torque applied in each direction is effected by cams mechanically connected to the brake band and the spring and positively actuated thereby as the spring flexes in opposite directions from neutral position.

Other objects and advantages of the invention will appear from a detailed description of the mechanism illustrated in the accompanying drawing, the same being an exemplary form of an embodiment of the invention and consisting of the features of construction and combinations of parts hereinafter described and claimed.

In the drawings,

Fig. 3 is a plan of the valve operator with parts broken away;

Fig. 4 is a horizontal section on line 4—4 of Fig. 2;

Fig. 5 is a horizontal section through the switch-control box on line 5—5 of Fig. 2;

Fig. 6 is another horizontal section through the switch-control box on line 6—6 of Fig. 2;

Fig. 7 is a vertical view of the switch box with its cover removed as seen from the right of Fig. 2.

Figure 1:
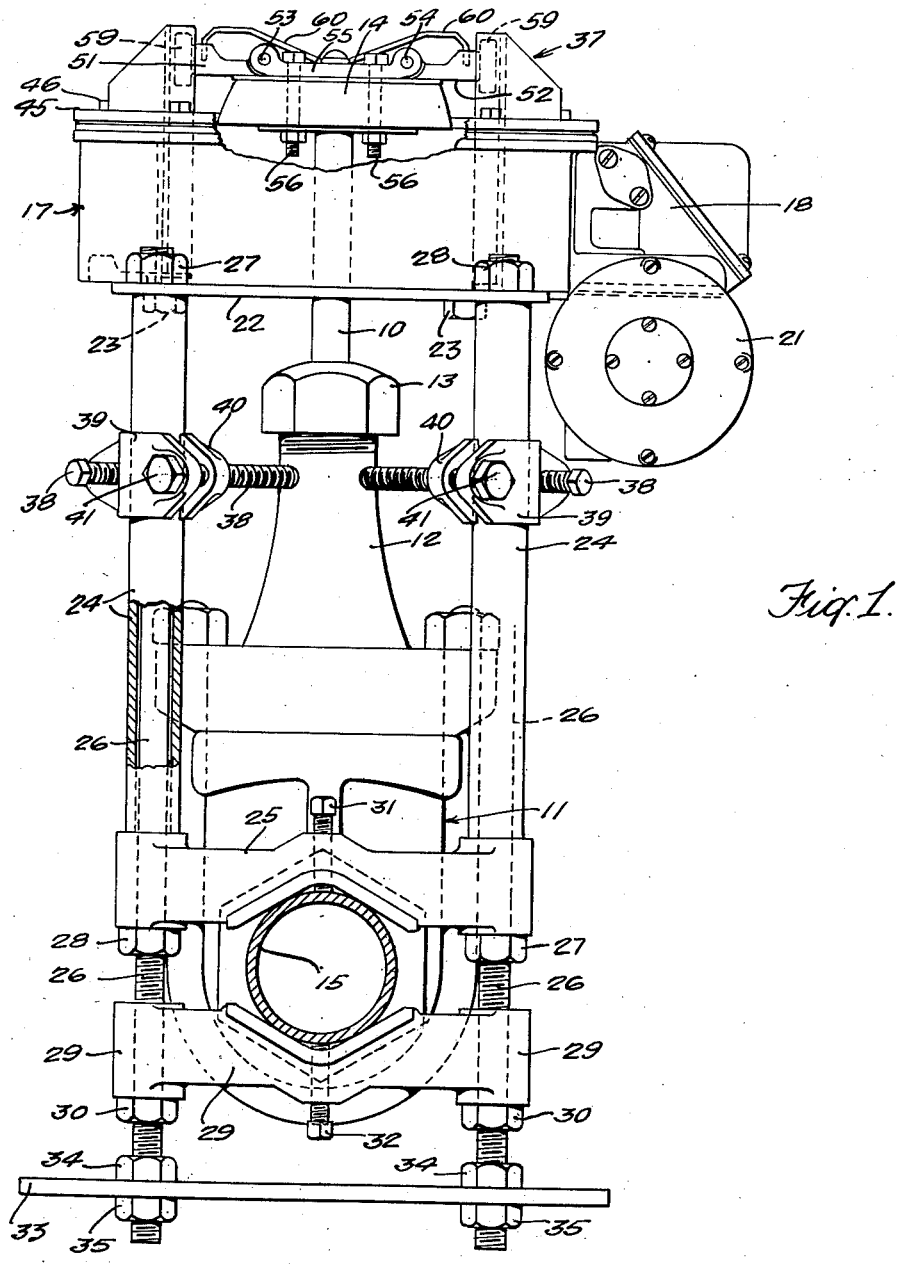
Fig. 1 is an elevational view of a valve operator in position for operating a valve.

The valve shown in the drawing is representative of any standard valve in which a rotating valve stem 10 moves upwardly and downwardly with respect to a stationary valve. The stem extends from a valve closure within a valve body 11 and passes through a bonnet 12, and a packing nut 13. The stem is rotated by a handwheel 14 which is fastened thereto. The valve body is connected in a pipe line between two pipe ends 15 and 16 in the customary manner. As installed, the valve is complete and ready for use. The moving parts of the valve operator are contained in and supported by a base member in the form of a casting comprising an annular housing 17 and a portion 18 projecting to one side of the annular housing. Another housing 19, containing the gearing generally indicated at 20, is detachably supported at the underside of the projection 18. The housing 19 also includes the front end of the casing of a motor 21 by which the motor is supported. The valve operator constitutes a complete assembly which is mounted on a valve as a unit. Any means suitable for rigidly supporting the operator with respect to the valve may be used.

Mounting may be accomplished by bolting the base member 17, 18, to a head plate 22 of any suitable frame by bolts 23 extending upwardly through holes in the plate and into lugs of the base member. The frame is secured to the valve body or to the pipe ends in such a manner as to hold the annular portion 17 of the base member at a proper elevation and concentric with respect to the axis of the valve stem. The valve stem 10 passes through a central opening in the plate 22.

The frame illustrated in the drawing includes four standards, one secured to each corner of the plate. Each standard consists of a pipe 24 with its upper end engaging the underside of the plate 22 and its lower end engaging a clamping member 25 and held tightly in place by a rod 26 passing through the pipe and nuts 27, 28, on the rod and tightened against the plate and the clamping member. A similarly arranged pipe and rod engage the plate 22 and the other end of the clamping member 25. The clamping member 25 has a jaw for engaging the top of a pipe. Each of the two rods 26 at one side of the valve body passes through a lower clamping member 29 which is held tightly against the underside of a pipe by a nut 30 threaded onto the rod. Further tightening of the supporting frame in secure position may be attained by the use of set screws 31, 32. The standards and clamps 25 and 29 are arranged in pairs, one pair at either side of the valve body. An auxiliary plate 33 and fastening nuts 34, 35, may be used to facilitate the assembly of the frame.

Before the clamps 25 and 29 are finally tightened into place care is taken to assure that the annular housing 17 and the bearings for the rotatable handwheel-actuating means 37 are concentric with the axis of the valve stem 10 by properly adjusting the set screws 38 against the valve bonnet. Each set screw is threaded through a clamp which is adjustably positionable on a standard.

In addition to a set screw 38 each clamp includes two oppositely facing clamping members 39 and 40 and a bolt 41.

Figure 2:
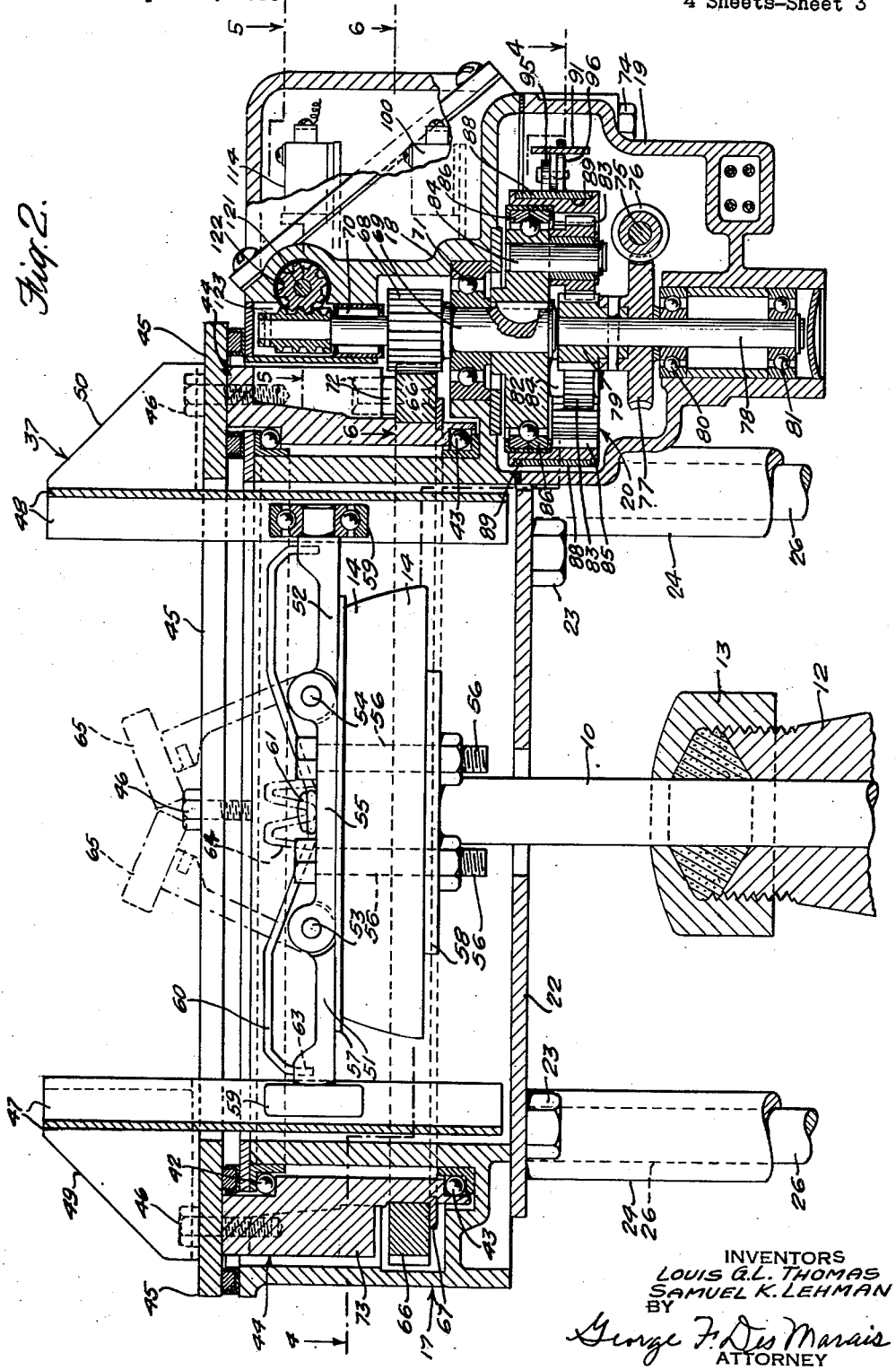
Fig. 2 is an enlarged vertical section taken on the axis of the valve stem and illustrating the driving parts.

As best seen in Fig. 2, the annular housing portion 17 of the base member carries an inner race for a set of upper ball bearings 42 and an inner race for a lower set of ball bearings 43, whereby the handwheel-actuating means 37 are rotatably supported. The actuating means comprise a collar 44 rotatably supported by the sets of ball bearings 42 and 43, a drive ring 45 fastened to the collar by a plurality of bolts 46 and guides 47 and 48 providing a pair of parallel tracks at locations diametrically opposite of the handwheel. The guides may be constituted of channel members, each of which is secured to the drive ring 45 by a pair of brackets 49, 50 welded to the drive ring 45 and to the respective channel members. The channel members are spaced apart a distance exceeding the diameter of the handwheel 14, and the flanges of the opposite members extend inwardly and provide tracks parallel to the axis of the valve stem for engagement by devices carried by the handwheel whereby the handwheel may be rotated in either direction of rotation. The channel members are sufficiently long to maintain a driving relationship with the devices on the handwheel for the full axial distance of travel (between full open and full closed positions) of the handwheel.

The channel-engaging devices are so constructed and arranged to permit discontinuance of their engaging relationship with the channel members, at will, in order that the handwheel may be operated by hand whenever manual operation is desirable. In the embodiment of the invention illustrated these devices include a pair of movable hinged members 51 and 52, each hinged member being essentially an arm pivotally mounted on a hinge pin 53 (54) carried by a hinge plate 55 which is secured to the handwheel by a set of bolts 56 extending through the handwheel and through plates 57 and 58, located above and below the handwheel. Preferably the free end of each hinged member or pivoted arm is fashioned as a stud on which an anti-friction roller 59 is mounted.

When the hinged members 51, 52 are extended laterally away from the valve stem, their free ends and rollers are positioned between the flanges of the channel members 47 and 48 and the valve handle is thereby turned upon rotation of the actuating means 37.

Each hinged member is held in position against the plate by a spring element 60 having an end pivoted on a headed pin 61 in the hinge plate 55 and its distal end bent towards a hinged member for engagement in a recess 63 therein. Upon lifting the distal end from the recess the spring element may be swung on its pivot pin 61 laterally across the hinge to a place of rest on the central hinge plate as shown in broken lines 64 in Fig. 2; whereupon, the hinged members or roller-bearing arms 51, 52, can be pivoted on their hinge pins to the positions indicated by broken lines 65. With the rollers disposed radially inwardly of the circular path of travel of the channel members the handwheel is rotatable independently of the power operator.

Torque is applied to the driving means 37, including the collar 44 and the channel members 47, from a toothed annulus 66 or a gear ring in the form of an annular rim having an inner circular bearing surface facing a cylindrical bearing surface on the collar. The toothed annulus is supported by a ring 67 carried by the collar 44. The gear teeth on the outer periphery of the annulus are constantly engaged with a pinion 68 which is fast to the output shaft 69 of the gear train 20.

The shaft 69 is journalled in a needle bearing 70 and a ball bearing 71 which are mounted in the projection 18 of the base member 17—18. The toothed annulus or gear ring 66 is rotatable with respect to the collar 44 through a limited arc to permit a run of the motor before the collar is picked up and the rotation of the handwheel is initiated. This is accomplished by a lost motion connection including a lug 72 riveted on the gear ring 66 and a lug 73 on the collar 44. The two lugs are located on equal radii so that the lug 73 is driven by the lug 72 when they are engaged and the gear ring rotates. The gear ring carries four lugs 72 and the collar carries four lugs 73 all spaced 90° apart on the respective members. The amount of lost motion provided by these lugs is equivalent to the free travel of a lug 72 between two successive lugs 73.

The gear housing 19 is attached to the underside of the projection 18 of the base member 17 by a plurality of bolts 74, Figs. 2 and 4, and the motor 21 is supported from one end of the housing. The motor shaft 75 carries a worm 76 which drives a worm wheel 77 pinned to a shaft 78 and to a sun gear 79 at one side of the speed reducing epicyclic gear train 20. The shaft 78 is journalled in bearings 80 and 81 in the housing 19.

The driven side of the gear train is a planet gear carrier 82 which is keyed to the output shaft 69. The planet gears 83 are individually mounted for rotation on stud shafts 84 extending from the carrier. The planet gears are meshed with the sun gear 79 and the internal teeth of a ring gear 85 to which is secured the outer race of a bearing 86 having an inner race on the outer periphery of the planet gear carrier.

A brake band 88 is frictionally seized on the cylindrical outer surface 89 of the planet gear carrier by a pair of bolts 90 which are adjustably set to prevent slipping of the band under all normal operating conditions. The band is connected to a cantilever spring 91, Fig. 4, whose base end is anchored to the underside of the projection 18 of the main base member 17—18 by screws 92. The ring gear 85 is normally resiliently restrained in rotation by the spring 91 in proportion to the torque acting to turn the ring gear. By thus mounting the brake band on the outer periphery of the ring gear 85, the restraining force is applied to the ring gear at the greatest moment arm of the ring gear and over a large frictional area, and by rotatably mounting the ring gear on the planet gear carrier 82 and the brake band on the outer surface of the ring gear, the bearing 86 is contained within a minimum over-all axial dimension of the carrier and planet gears. These features of construction provide compactness and space-saving qualities so desired in a gear train suitable in a power-operating mechanism for small valves.

The force resulting from the torque applied to the ring gear 85 is transmitted to the spring 91 through a lug 93, welded to the brake band, a pin 94 passing through the lug and through a pair of conjointly acting links 95 and 96 pivotally connected to the movable end of the spring. The combined over-all length of the links is such that in moving in opposite directions one end or the other of the links will come into engagement with one or the other of opposite side walls of the housing and thereby limit the turning arc of the brake band in either direction and the maximum travel of the devices which actuate the torque limit switches hereinafter described. Should the torque become sufficiently great in either direction of movement to carry an end of the links into contact with the housing, the brake band will slip with respect to the gear ring. This arrangement affords means for preventing breakage of parts should the power drive fail to be discontinued during normal operation. The maximum torque transmittable through the gearing is determined by the tightness of the brake band 88 on the drum surface 89 and this can be varied by adjustment of the bolts 90 which connect between the ends of the brake band.

Normally the torque deliverable by the motor is limited by switches in the motor circuit. Referring particularly to Figs. 6 and 7, cams 98 and 99 are for controlling torque limit switches 100 and 101, respectively. The cams are actuated in response to a turning movement of the brake band through a rockshaft 102 journalled in the projection 18 of the main base member 17. The pin 94 in the lug 93 is engaged in an elongated hole in an arm 103 which is fixed to the lower end of the rockshaft 102, and a similar arm 104, fixed to the upper end of the rockshaft, reciprocates a shaft 105 through a pin and slot connection 106 between the arm 104 and the shaft. The shaft 105 is slidably supported in bushings 107 and 108 mounted on a bracket 109 and is held against rotation by the engagement of the cams 98 and 99 with the bracket 109.

A desired torque limit in either direction of movement of the valve closure is determined by the location of one or the other of the cams 98 and 99 on the shaft 105. Each cam is adjustably positionable along the shaft by a pinion 110 in engagement with a rack 111 on the shaft and each cam is firmly held in adjusted position on the shaft by a set screw 112. Owing to the positive connection between the shaft 105 and the brake band 88 the cams 98 and 99 are positively actuated in both directions in proportion with the turning moment or torque on the ring gear 85.

The position of the valve closure is determined by one or the other of limit switches 114 and 115 (Figs. 5 and 7), depending on the direction of rotation of the motor and the accompanying movement of the valve toward an open or a closed position. The switches 114 and 115 are respectively operated by cams 116 and 117 which are translated lengthwise of a screw 118.

The screw is axially restrained by and rotatably journalled in bushings carried by a bracket 119 on which the switches 114 and 115 are mounted. At one end of the screw 118 there is a coupling in the nature of a tongue and groove connection 120 with a shaft 121 which is journalled in the projection 18 of the main base member 17 and carries a worm wheel 122 engaged with a worm wheel 123 on the output shaft 69 of the gear train 20.

Each of the cams 116 and 117 is tightened on a bushing 124 by a set screw 125. Each bushing has an internal thread engaging with the screw 118 and each bushing and cam is prevented from rotating on the screw by a flat sliding contact between the cam and the horizontal leg of the bracket 119. Accordingly, the cams 116 and 117 are moved linearly in proportion to the rotation of the shaft 69. The location of the cams 116 and 117 on the screw 118 for any given position of the valve closure and with respect to the switches 114 and 115 determine the desired open and shut positions of the valve closure.

Any suitable conventional reversible motor and controlling circuits may be employed in which the position switch 114 and the torque switch 100 are connected to stop the running of the motor in one direction, and the position switch 115 and the torque switch 101 are connected to stop the running of the motor running in the opposite direction. The cams 98 and 116 can be set to actuate the switches 100 and 114, respectively, at the same or at different times in one direction of operation, and the cams 99 and 117 can likewise be set to actuate the switches 101 and 115, respectively, at the same or at different times during the operation of the motor in the other direction. A reversing switch (not shown) is utilized to energize the operating circuits whenever power actuation of the valve is desired.

The operation of the apparatus will be apparent to those skilled in the art in view of the foregoing disclosure. The principle of operation, together with the mechanism which is now considered to represent the best embodiment thereof, has been described, but it is desired that it be understood the mechanism disclosed is only illustrative and that the invention can be carried out by other means. Also, while the mechanism is designed to use the various features and elements in the combinations and relations described, some of these may be altered and others omitted without interfering with the substance of the invention and the general results outlined.

What is claimed is:

1. A power operator for rotatably actuating an axially movable handwheel of a valve, said operator comprising a base member and a support therefor, means rotatably mounted on said base member for rotatably actuating said handwheel, said actuating means having an opening therethrough providing clearance for the axial movement of said handwheel, said handwheel actuating means including guides disposed outside the outer perimeter of said handwheel and extending parallel to the axis of said handwheel a distance commensurate with the axial distance of movement of said handwheel between open and closed positions, means attached to said handwheel and extending outwardly beyond the outer perimeter of the handwheel for engagement by said guides to provide a rotary drive connection between said guides and said handwheel, and means for driving said rotatable actuating means.

2. A power operator for rotatably actuating an axially movable handwheel of a valve, said operator comprising a base member and a support therefor, means rotatably mounted on said base member for rotatably actuating said handwheel, said handwheel actuating means having an opening therethrough providing clearance for the axial movement of said handwheel, said handwheel actuating means comprising a pair of channel members disposed parallel to the axis of rotation of said handwheel and outside the outer periphery of said handwheel, said channel members having their flanges extending toward the periphery of said handwheel, means attached to said handwheel and extending outwardly beyond the outer periphery of said handwheel for engagement by the flanges of said channel member, and means for driving said rotatable actuating means.

3. A power operator for rotatably actuating an axially movable handwheel of a valve, said operator comprising a base member and a support therefor, means rotatably mounted on said base member for actuating said handwheel, said handwheel actuating means having an opening therethrough providing clearance for the axial movement of said handwheel, said handwheel actuating means including guides disposed outside the outer periphery of said handwheel and extending parallel to the axis of said handwheel a distance commensurate with the distance of axial movement of said handwheel between open and shut positions of said valve, means attached to said handwheel for engaging said guides, said means including a plate fastened to said handwheel, arms pivotally mounted on said plate to swing into engagement with said guides for providing a driving relationship between said guides and said handwheel, means for holding said arms in engaging relationship with said guides, said arms being movable out of engagement with said guides to permit manipulation of the handwheel independently of said handwheel actuating means.

4. A power operator for rotatably actuating an axially movable handwheel of a valve, said operator comprising a base member and a support therefor, means rotatably mounted on said base member for actuating said handwheel, said handwheel actuating means comprising a ring member having an opening providing clearance for the axial movement of said handwheel therethrough and guides disposed outside the outer perimeter of said handwheel and extending parallel to the axis of said handwheel a distance commensurate with the axial distance of movement of said handwheel between open and closed positions, means attached to said handwheel and extending outwardly from the outer perimeter of the handwheel for engagement by said guides to provide a rotary drive connection between said guides and said handwheel, a reversible motor, gearing intermediate said motor and said handwheel actuating means, and means supporting said gearing and said motor from said base member.

5. A power operator for rotatably actuating an axially movable handwheel of a valve, said operator comprising a base member and a support therefor, actuating means for said handwheel, said actuating means comprising a member rotatably mounted on said base member and a member attached to said handwheel, one of said actuating means comprising guides parallel to the axis of said handwheel and commensurate in length with the axial distance of movement of said handwheel between open and shut positions and the other of said actuating means comprising an element engageable at will with said guides for transmitting rotary motion therebetween, a reversible motor, gearing intermediate said motor and said handwheel actuating means, said gearing including an epicyclic gear train having a first member driven by said motor, a second member for driving said handwheel actuating means, and a member intermediate said first and second members, said second member carrying planet gears meshing with said first member and said intermediate member, said intermediate member having a brake drum, a brake band frictionally engaging said brake drum, resilient means connected to said brake band for balancing the turning moment on said brake band, torque limit switches, cams for operating said switches, means positively connected with said brake band and said cams for actuating said cams in opposite directions proportionally to the turning moment on said brake band in accordance with the direction of movement of said intermediate member.

6. A power operator for rotatably actuating a handwheel, said operator comprising a base member and a support therefor, means rotatably mounted on said base member for actuating said handwheel, a motor, an epicyclic gear train comprising a first member driven by said motor, a second member for driving said handwheel actuating means, and a member intermediate said first and second members, said second member carrying planet gears meshing with said first member and said intermediate member, said intermediate member having a brake drum, a brake band frictionally engaging said brake drum, a cantilever spring having its movable end connected to said brake band for resiliently restraining rotation of said brake band and said intermediate member, torque limit switches, cams for operating said switches, means positively connected with said brake band and said cams for actuating said cams in opposite directions proportionally to the flexing of said spring in accordance with the direction of movement of said intermediate member.

7. A power operator for rotatably actuating a handwheel, said operator comprising a base member and a support therefor, means rotatably mounted on said base member for actuating said handwheel, a reversible motor, switches for controlling said motor, an epicyclic gear train comprising a first member driven by said motor, a second member for driving said handwheel actuating means, and a third member intermediate said first and second members, said second member carrying planet gears meshing with said first member and with said third member, said third member having a brake drum surface around its exterior, a bearing rotatably mounting said third member on said second member, a brake band frictionally engaging said brake drum surface, means resiliently restraining rotational movement of said brake band and said third member, and means controlled by the movement of said brake band for actuating said switches at predetermined torques on said brake band in either direction of rotation of said motor.

8. A power operator for rotatably actuating a handwheel, said operator comprising a base member and a support therefor, means rotatably mounted on said base member for actuating said handwheel, a motor, an epicyclic gear train comprising a first member driven by said motor, a second member for driving said handwheel actuating means, and a ring gear intermediate said first and second members, said second member carrying planet gears meshing with said first member and said ring gear, a bearing rotatably mounting said ring gear in a race carried on the outer peripheral surface of said second member, a brake drum on said ring gear, a brake band frictionally seized on said brake drum, means resiliently acting to restrain said brake band and said ring gear from rotating in opposite directions, and means controlled by the movement of the brake band in either direction of rotation for stopping the motor at predetermined torques exerted on said ring gear and brake band.

No references cited.